(12) United States Patent
Tighe et al.

(10) Patent No.: US 8,828,615 B2
(45) Date of Patent: *Sep. 9, 2014

(54) ACOUSTIC SPEED OF SOUND MEASUREMENT USING BANDPASS FILTERING OF AUTOMOTIVE PRESSURE SENSORS

(75) Inventors: Thomas W. Tighe, Bloomfield, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/104,671

(22) Filed: May 10, 2011

(65) Prior Publication Data

US 2012/0288780 A1 Nov. 15, 2012

(51) Int. Cl.
*H01M 8/04* (2006.01)
*H01M 8/06* (2006.01)

(52) U.S. Cl.
USPC ............................ 429/428; 429/415; 429/443

(58) Field of Classification Search
USPC ......................................... 429/428, 415, 443
See application file for complete search history.

(56) References Cited

U.S. PATENT DOCUMENTS 8,603,688 B2 * 12/2013 Harris et al. .................. 429/428

OTHER PUBLICATIONS

Stephen Butterworth (1930) "On the Theory of Filter Amplifiers," Experimental Wireless and the Wireless Engineer, vol. 7, pp. 536-541.*
Tighe, Thomas W. et al. U.S. Appl. No. 12/913,324, filed Oct. 27, 2010, entitled "Anode Gas Composition Utilizing M2 Injection Pressure Wave Propagation Rates."

* cited by examiner

*Primary Examiner* — Patrick Ryan
*Assistant Examiner* — Julian Anthony
(74) *Attorney, Agent, or Firm* — John A. Miller; Miller IP Group, PLC

(57) ABSTRACT

A fuel cell system that determines the concentration of hydrogen gas in an anode loop. The fuel cell system includes at least one fuel cell, an anode inlet, an anode outlet, an anode loop, a source of hydrogen gas and an injector for injecting the hydrogen gas. First and second pressure sensors are provided in the anode loop and are spaced a known distance from each other. A controller responsive to the output signals from the first and second pressure sensors filters the sensor signals from the first and second pressure sensors and determines the concentration of hydrogen gas in the anode loop based on the time difference between the filtered sensor signal from the first pressure sensor and the filtered sensor signal from the second pressure sensor.

20 Claims, 2 Drawing Sheets

ACOUSTIC SPEED OF SOUND MEASUREMENT USING BANDPASS FILTERING OF AUTOMOTIVE PRESSURE SENSORS

BACKGROUND OF THE INVENTION

1. Field of the Invention

This invention relates generally to a system and method for detecting and identifying the composition of gases flowing in an anode sub-system of a fuel cell system and, more particularly, to a system and method for detecting and identifying the composition of gases flowing in an anode sub-system of a fuel cell system using a filtered acoustic delay between two or more locations in the anode sub-system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, cathode side partial pressures will cause oxygen and nitrogen to permeate through the membrane. The permeated oxygen reacts in the presence of the anode catalyst, but the permeated nitrogen in the anode side of the fuel cell stack dilutes the hydrogen. If the nitrogen concentration increases above a certain percentage, such as 50%, the fuel cell stack may become unstable and may fail.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly as degradation of the components of the fuel cell system occurs over time. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

As discussed above, the performance of the fuel cell system is influenced by the composition of gases entering the stack on the anode and cathode. During normal operation of the fuel cells, nitrogen from the cathode side permeates through the membrane to the anode side, which dilutes the fuel concentration. If there is too much nitrogen or water in the anode side, cell voltages may decrease. While laboratory sensors may be used to measure actual fuel concentration levels, it is not practical to use these sensors to measure the concentration of hydrogen in the anode sub-system of a consumer product. Lab grade thermal conductivity sensors may be used, however, they are large and expensive, and can be damaged by liquid water, which may be present in the anode sub-system. Diffusion based models with reset capability may also be used. However, this approach periodically purges enough anode gas to ensure there is no nitrogen present in the anode sub-system, which may cause hydrogen fuel to be wasted. Acoustic methods employing transceivers may be used to determine the composition of an anode gas, however, this requires an acoustic signal strong enough to overcome background noise and liquid water effects. This approach can also be difficult to package and required proper sensor spacing First and second acoustic sensors is another approach, however, using this approach requires the addition of microphone style sensors that are additional components which require sourcing, development, validation and additional parts in the fuel cell system that provide no other benefit. Therefore, there is a need in the art to detect and identify the composition of gases in the anode sub-system of a fuel cell system in a cost effective way to control the fuel concentration in the anode sub-system.

SUMMARY OF THE INVENTION

The present invention discloses a fuel cell system that includes at least one fuel cell, an anode inlet, an anode outlet, an anode loop, a source of hydrogen gas and an injector for injecting the hydrogen gas. First and second pressure sensors are provided in the anode loop and are spaced a known distance from each other. A controller responsive to the output signals from the first and second pressure sensors filters the sensor signals from the first and second pressure sensors and determines the concentration of hydrogen gas in the anode loop based on the time difference between the filtered sensor signal from the first pressure sensor and the filtered sensor signal from the second pressure sensor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the concentration of gases in an anode sub-system of a fuel cell system using pressure sensors is merely exemplary in nature, and is in no way intended to limit the invention or its applications or uses.

Figure 1:
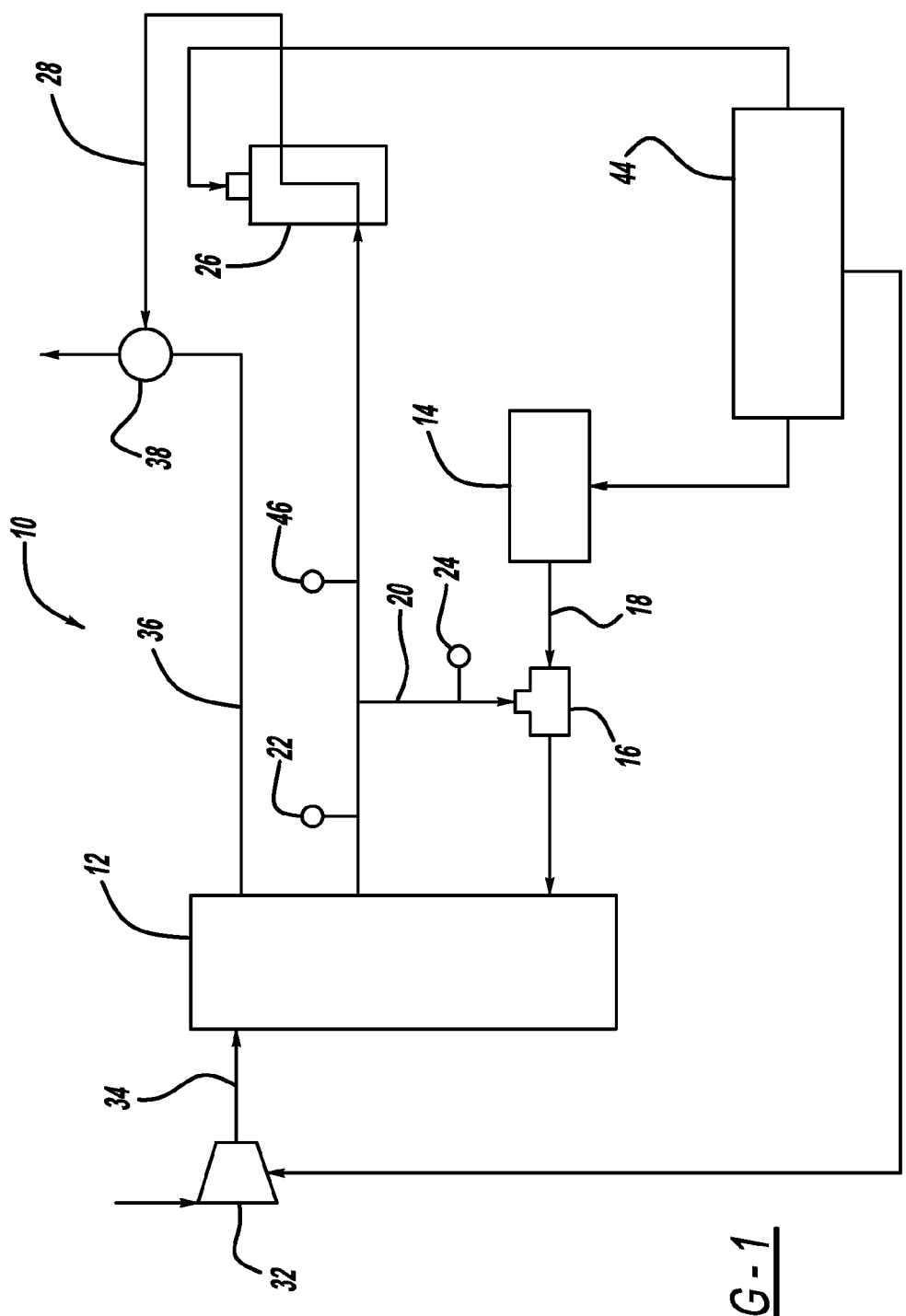
FIG. 1 is a simplified block diagram of a fuel cell system.

FIG. 1 is a simplified block diagram of a fuel cell system 10 including a fuel cell stack 12. Hydrogen gas from a hydrogen source 14 is provided to the anode side of the fuel cell stack 12 on an anode input line 18 utilizing an injector 16, such as an injector/ejector, as described in U.S. Pat. No. 7,320,840 entitled, "Combination of Injector-Ejector for Fuel Cell Systems," issued Jan. 22, 2008, assigned to the assignee of this application and incorporated herein by reference. An anode effluent gas provided at an output of the anode side of the stack 12 is routed back into the fuel cell stack 12 on an anode recirculation line 20. The anode input line 18, the injector 16, the anode side of the stack 12 and the anode recirculation line 20 are all components that make up an "anode sub-system," and the anode input line 18 and the anode recirculation line 20 make up an "anode loop" as is known to those skilled in the art. Nitrogen cross-over from the cathode side of the fuel cell stack 10 dilutes the hydrogen in the anode side of the stack 12, thereby affecting fuel cell stack performance. Therefore, it is necessary to periodically bleed the anode effluent gas from the anode sub-system using a bleed valve 26 to reduce the amount of nitrogen in the anode sub-system, i.e., in the anode side of the fuel cell stack 12. When the bleed valve 26 is open, the bled anode exhaust gas flows through a bleed line 28.

The anode loop includes a first pressure sensor 22 and a second pressure sensor 24, spaced apart by a known distance. As is shown in FIG. 1, the pressure sensors 22 and 24 may be located in the anode recirculation line 20. However, although not shown for the sake of clarity, one of the pressure sensors may be located in the anode inlet line 18 at a location between the injector 16 and the stack 12. Additionally, instead of the two sensors 22 and 24 being pressure sensors, one of the sensors 22 and 24 may be a pressure sensor that is located in the anode inlet line 18 or the anode recirculation line 20, and the other of the two sensors 22 and 24 may be a piezoelectric sensor, i.e., an acoustic sensor.

Sensor examples of pressure sensors suitable for this purpose include commercially available automotive pressure sensors. For testing purposes, lab grade sensors can be used, however, less expensive sensors that can hold a +/−5% accuracy are more economically feasible. A temperature sensor 46 for measuring the temperature of the anode gas in the recirculation line 20 is also provided, or the anode recirculation gas temperature can be modeled using coolant temperature as an input.

Air from a compressor 32 is provided to the cathode side of the fuel cell stack 12 on line 34. A cathode gas is output from the fuel cell stack 12 on a cathode gas line 36. A mixing device 38 is provided in the line 36 for mixing the cathode gas from the stack 12 and the bled anode exhaust gas from the line 28.

A controller 44 monitors the temperature and pressure of the anode sub-system of the fuel cell system 10, controls the speed of the compressor 32, controls the injection of hydrogen from the injector 16 to the anode side of the stack 12, and controls the position of the anode bleed valve 26, as is discussed in more detail below.

The speed of sound in a gas is related to the temperature and the average atomic mass of the gas. When the speed of sound is known, the distance between two points can be determined by timing. This is the principle that commercial range finders use for measuring short distances. Knowledge of the distance between two acoustic sensors, and the time delay between the acoustic detection of sound emitted from the sound source by each acoustic sensor can be used to determine the speed of sound in the gas between the acoustic sensors by relating the response time to the speed of sound, as is described in U.S. patent application Ser. No. 12/913,324 entitled, "Anode Gas Composition Utilizing H2 Injection Pressure Wave Propagation Rates," filed Oct. 27, 2010, assigned to the assignee of this application and incorporated herein by reference.

As is discussed in detail below, the first pressure sensor 22 and the second pressure sensor 24, when spaced a known distance apart, may be used in place of acoustic sensors by filtering the raw output of the pressure sensors 22 and 24 using bandwidth filtering to determine the amount of time it takes for the sound from a sound source, such as the injector 16, to travel to each of the pressure sensors 22 and 24. In an alternate embodiment, more than two pressure sensors may be utilized, with each pressure sensor being a known distance from at least one other pressure sensor. The sound emitted from the injector comes from sonic shock waves of the flow of hydrogen through a sonic nozzle of the injector 16 and from the sound of a spindle in the injector 16 hitting a seat upon injection of hydrogen and closing of the injector.

By utilizing the known distance between the pressure sensors 22 and 24, and the known time delay between the detection of the sound emitted from the injector 16 by each of the sensors 22 and 24 after the response from each of the sensors 22 and 24 has been filtered using bandwidth filtering, in combination with the temperature and the speed of sound in the gas in the anode sub-system, the average molar mass of the gas in the anode may be predicted utilizing the following equation:

$$C_{ideal} = \sqrt{\gamma \cdot \frac{p}{\rho}} = \sqrt{\frac{\gamma \cdot R \cdot T}{M}} \quad (1)$$

Where $C_{ideal}$ is the speed of sound in an ideal gas (m/s), R is the molar gas constant (approximately 8.3145 J·mol$^{-1}$·K$^{-1}$), $\gamma$ (gamma) is the adiabatic index, which may be assumed to be 7/5 or 1.400 for diatomic molecules from kinetic theory, T is the absolute temperature in Kelvin and M is the molar mass in kilograms per molecule. By way of example, the mean molar mass for dry air is about 0.0289 kg/mol and the molar mass of hydrogen is approximately 0.00202 kg/mol.

The measured molar mass ($M_{measured}$), shown as M in equation (1), is a product of the molar fraction and the molar mass of $H_2$, $N_2$ and $H_2O$ found in the anode sub-system, and thus, the calculation of the hydrogen molar fraction ($x_{H2}$) in the effluent gas of the anode sub-system can be summarized by:

$$M_{measured} = x_{H_2} \cdot M_{H_2} + y_{N_2} \cdot M_{N_2} + z_{H_2O} \cdot M_{H_2O} \quad (2)$$

Where $x_{H_2}$ is the molar fraction of hydrogen, $M_{H_2}$ is the molar mass of hydrogen, $y_{N_2}$ is the molar fraction of nitrogen, $M_{N_2}$ is the molar mass of nitrogen, $z_{H_2O}$ is the molar fraction of water and $M_{H_2O}$ is the molar mass of water.

By definition, the sum of the molar fractions of hydrogen, nitrogen and water, discussed above, must add to 1, thus:

$$1 = x_{H_2} + y_{N_2} + z_{H_2O} \quad (3)$$

or $$y_{N_2} = 1 - x_{H_2} - z_{H_2O} \quad (4)$$

Based on knowledge of the operating temperature, reactant stoichiometry and accumulation of water in components of the fuel cell system 10, the relative humidity of the measured gas stream can be estimated. To solve for $z_{H_2O}$, a modeled or measured RH value $RH_{\%\ MODEL}$ from the controller 40 may be converted to a molar fraction using the following equation:

$$z_{H_2O} = \frac{RH_{\%\ MODEL} P_{sat,H_2O}}{P_{gas}} \quad (5)$$

Where $P_{sat,H_2O}$ is the partial pressure of water and $P_{gas}$ is the partial pressure of the anode effluent gas.

Using equations (2), (4) and (5), equation (2) may be rewritten to solve for $x_{H_2}$ using:

$$x_{H_2} = \frac{M_{measured} - M_{N_2} + (M_{H_2O} - M_{N_2}) \cdot \left(\frac{RH_{(\%\ MODEL)} \cdot P_{sat,H_2O}}{P_{gas}}\right)}{(M_{H_2} - M_{N_2})} \quad (6)$$

Because the pressure sensors 22 and 24 detect a pressure response when the injector 16 emits the audible noise, the pressure response from the sensors 22 and 24 may be filtered to detect the noise of the injector 16. Thus, the signal from the pressure sensors 22 and 24 can be processed so that automotive pressure sensors, which are readily available, can be used to measure the speed of sound of an anode gas to ensure hydrogen starvation does not occur in the anode side of the fuel cell stack 12. This approach eliminates the need for hardware such as acoustic sensors that are not readily available and that also require sourcing, development and validation. While microphone type sensors provide a better signal than pressure sensors for detecting the audible noise of an injector when looking at the response of raw signals, the signals from the pressure sensors 22 and 24 may be filtered to provide suitable results for determining the concentration of the anode gas, as is discussed in more detail below.

Using the injector opening or closing command as an initialization trigger to monitor the pressure sensors 22 and 24 for their response signals to the noise of the injector 16 opening or closing, the time lag between the secondary triggers, i.e., the sensors 22 and 24, can be identified after a calibration time or predetermined time, as is discussed in more detail below. Next, the time lag between the secondary triggers can be calibrated to a gas concentration as discussed above. To filter the response of the sensors 22 and 24, an analog filter or a microprocessor may be used to filter the signal of the sensors 22 and 24. Any suitable filter may be used, for example, a Butterworth filter implemented on a commercially available programmable microcontroller.

When using a pressure sensor in one location and a piezoelectric sensor in a second location, as opposed to using two pressure sensors, this arrangement provides the advantage of using a pressure sensor where there is plenty of signal near the injector and a piezoelectric sensor further away where there may be so much attenuation that using a pressure sensor may be difficult. This may also be utilized when bandpass filtering is not desired and/or a first response approach is desired.

Figure 2:
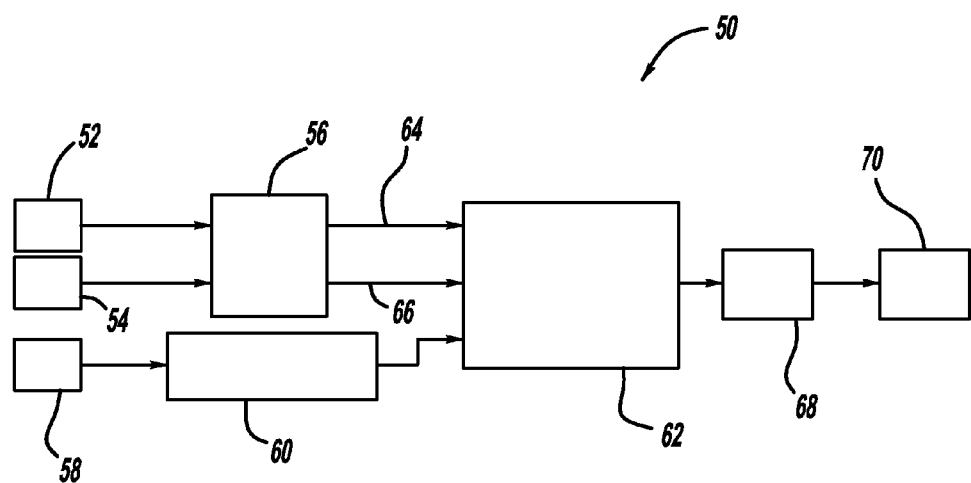
FIG. 2 is a flow chart diagram of an algorithm for determining the concentration of gases in an anode sub-system.

FIG. 2 is a flow diagram 50 of an algorithm for determining the time delay between the first pressure sensor 22 detecting the audible noise from the injector 16 and the second pressure sensor 24 detecting the audible noise from the injector 16. A first sensor input 52 and a second sensor input 54 are provided to a bandpass filter block 56 where the frequencies of the first sensor input 52 and the second sensor input 54 are filtered to a predetermined frequency bandwidth. For example, the bandpass filter block 56 may filter the first sensor input 52 and the second sensor input 54 to remove the pressure components that are responsive to volume in the anode, i.e., low frequency noise. High frequencies are also removed to eliminate background noises that are not believed to be in the audio range of interest, thus, the focus of the response from the pressure sensors 22 and 24 is the acoustic component from the noise of the injector 16. An example of the acoustic component of interest is a range of 100-200 Hertz (Hz).

An injector command input 58 is provided to an injector trigger with time delay block 60, and the injector trigger with time delay block 60 is inputted into a zero crossing detection block 62. A first sensor filtered output line 64 and a second sensor filtered output line 66 are also provided to the zero crossing detection block 62. The zero crossing detection block 62 utilizes the first and second sensor outputs 64 and 66 to determine when the first sensor filtered output from the line 64 crosses zero. When the first sensor filtered output from the line 64 crosses zero, meaning the filtered signal from the first sensor crosses a predetermined zero threshold, the zero crossing detection block 62 is set to true. When the second sensor filtered output from the line 66 crosses zero, the zero crossing detection block 62 is set to false. When the zero crossing detection block 62 is set to true, a counter at a block 68 counts the number of samples of the predetermined bandwidth that are collected per time until the zero crossing detection block 62 is set to false. The result of the counter at the block 68 gives a time delay at a time delay block 70. For example, the time delay of a sound wave traveling a distance of 0.73 meters at the time delay block 70 may be 1.43 milliseconds for a fuel cell stack operating at 50% relative humidity. The time delay is then used to calculate the concentration of the anode gas as discussed in the equations above.

Figure 3:
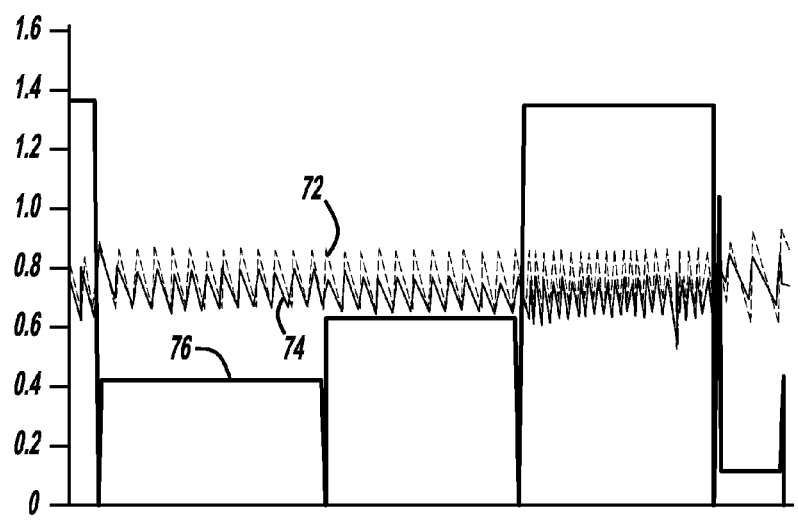
FIG. 3 is a graph with time on the x-axis and current density and hydrogen concentration on the y-axis, illustrating the measured response of validated sensors and automotive sensors.

FIG. 3 is a graph with time on the x-axis and current density and hydrogen concentration on the y-axis, illustrating the measured response of validated sensors and the pressure sensors 22 and 24. Line 72 represents the response of the pressure sensors 22 and 24, line 74 represents a validated sensor and line 76 represents stack current density. As shown in FIG. 3, the signal of the pressure sensors 22 and 24 detect the sound of the injector 16 such that the hydrogen concentration may be determined as desired. FIG. 3 also illustrates that as the time delay between the pressure sensors 22 and 24 increases, there is less hydrogen in the system.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    at least one fuel cell including an anode inlet and an anode outlet, said anode inlet and said anode outlet being coupled by an anode loop;
    a source providing hydrogen gas to the anode inlet;
    an injection device for injecting the hydrogen gas from the source to the anode inlet, said injection device producing an audible injection noise when it injects the hydrogen gas;
    first and second pressure sensors located in the anode loop and spaced a known distance from each other, said first and second pressure sensors providing signals in response to the injection device producing an audible injection noise when it injects the hydrogen gas; and
    a controller being responsive to the sensor signals from the first and second pressure sensors, said controller being configured to filter the sensor signals from the first and the second pressure sensors so as to determine a concentration of hydrogen gas in the anode loop based on the time difference between the filtered sensor signal from the first pressure sensor and the filtered sensor signal from the second pressure sensor.

2. The fuel cell system according to claim 1 wherein the controller filters the signal responses from the first pressure sensor and the second pressure sensor to focus the responses from the first and second pressure sensors to an acoustic component emitted from the noise of the injector.

3. The fuel cell system according to claim 2 wherein the acoustic component from the noise of the injector is in a range of 100-500 Hertz or higher.

4. The fuel cell system according to claim 1 wherein the controller includes an analog filter to filter the signals of the first pressure sensor and the second pressure sensor.

5. The fuel cell system according to claim 4 wherein the controller includes a microprocessor to filter the signals from the first pressure sensor and the second pressure sensor.

6. The fuel cell system according to claim 5 wherein the microprocessor includes a Butterworth filter.

7. The fuel cell system according to claim 1 wherein the first pressure sensor and the second pressure sensor are automotive pressure sensors.

8. A fuel cell system comprising:
    at least one fuel cell including an anode inlet and an anode outlet, said anode inlet and said anode outlet being coupled by an anode loop;
    a source for providing hydrogen gas to the anode inlet;
    an injection device for injecting the hydrogen gas from the source to the anode inlet, said injection device producing an audible injection noise when it injects the hydrogen gas;
    first and second sensors located in the anode loop and spaced a known distance from each other, said first and second sensors detecting the injection noise and providing sensor signals that include the injection noise, said first sensor being a pressure sensor that is closer to the injection device than the second sensor, said second sensor being a piezoelectric sensor;
    a filter that filters the sensor signals from the first pressure sensor to a predetermined audible range; and
    a controller that is responsive to the filtered sensor signals from the first pressure sensor and the sensor signal of the second sensor, said controller being configured to determine the time between when the controller receives the filtered sensor signals from the first sensor and when the controller receives the sensor signal from the second sensor so as to determine a concentration of a gas in the anode loop.

9. The fuel cell system according to claim 8 wherein the filter processes the signal responses from the first sensor to focus the responses from the first sensor to an acoustic component of the noise of the injector.

10. The fuel cell system according to claim 9 wherein the acoustic component of the noise of the injector is in a range of 100-500 Hertz or higher.

11. The fuel cell system according to claim 8 wherein the filter includes an analog filter to filter the signals of the first sensor.

12. The fuel cell system according to claim 8 wherein the filter includes a microprocessor to filter the signals of the first sensor.

13. The fuel cell system according to claim 12 wherein the microprocessor includes a Butterworth filter.

14. The fuel cell system according to claim 8 wherein the first sensor is an automotive pressure sensor.

15. A method for determining the concentration of hydrogen gas in an anode loop of a fuel cell system, said fuel cell system including at least one fuel cell having an anode inlet and an anode outlet coupled by the anode recirculation line, said method comprising:
    providing hydrogen gas to the anode inlet using an injection device;
    detecting an injection noise from the injection device at a first location in the anode recirculation line;
    detecting the injection noise from the injection device at a second location in the anode recirculation line that is a known distance from the first location;
    filtering the injection noise received at the first location and the second location to provide a first filtered signal of the detected noise from the first location and a second filtered signal of the detected noise from the second location; and
    determining the concentration of hydrogen gas in the anode recirculation line based on the detection time between the first filtered signal and the second filtered signal.

16. The method according to claim 15 wherein filtering the injection noise received at the first location and the second location includes filtering the signal responses from the first location and the second location to focus the response from the first location and the second location to an acoustic component of the noise of the injector.

17. The method according to claim 16 wherein the acoustic component of the noise of the injector is in a range of 100-500 Hertz or higher.

18. The method according to claim 15 wherein filtering the injection noise detected at the first location and the second location includes utilizing an analog filter or a microprocessor.

19. The method according to claim 18 wherein the microprocessor includes utilizing a Butterworth filter.

20. The method according to claim 15 wherein detecting the injection noise at the first location includes utilizing a first pressure sensor, and detecting the injection noise at the second location includes utilizing a second pressure sensor.

* * * * *